United States Patent
Karimli et al.

(10) Patent No.: US 10,587,558 B2
(45) Date of Patent: Mar. 10, 2020

(54) SOCIAL PRESENCE

(71) Applicant: T-Mobile USA, Inc., Bellevue, WA (US)

(72) Inventors: Yasmin Karimli, Kirkland, WA (US); Karthik Iyer, Bellevue, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 428 days.

(21) Appl. No.: 14/923,160

(22) Filed: Oct. 26, 2015

(65) Prior Publication Data
US 2016/0127295 A1 May 5, 2016

Related U.S. Application Data

(60) Provisional application No. 62/072,301, filed on Oct. 29, 2014.

(51) Int. Cl.
| | |
|---|---|
| H04L 12/58 | (2006.01) |
| H04L 29/08 | (2006.01) |
| H04W 4/42 | (2018.01) |
| H04W 4/02 | (2018.01) |

(52) U.S. Cl.
CPC .............. *H04L 51/20* (2013.01); *H04L 67/24* (2013.01); *H04W 4/42* (2018.02); *H04L 51/043* (2013.01); *H04W 4/02* (2013.01)

(58) Field of Classification Search
CPC ....... H04L 51/20; H04L 67/24; H04L 51/043; H04W 4/046; H04W 4/42; H04W 4/02
See application file for complete search history.

(56) References Cited

U.S. PATENT DOCUMENTS

| | | | | |
|---|---|---|---|---|
| 7,689,752 | B1 * | 3/2010 | Redford | H04L 67/12 340/945 |
| 2007/0021117 | A1 * | 1/2007 | McKenna | H01Q 21/007 455/431 |
| 2008/0114776 | A1 * | 5/2008 | Sun | H04L 67/24 |
| 2009/0003576 | A1 * | 1/2009 | Singh | G06Q 10/107 379/202.01 |
| 2009/0100145 | A1 * | 4/2009 | Szeto | G06F 15/173 709/217 |

(Continued)

*Primary Examiner* — Soe Hlaing
(74) *Attorney, Agent, or Firm* — Lee & Hayes, P.C.

(57) ABSTRACT

Publishing social presence data associated with users in flight to other users associated with messaging services is described. Technologies described herein include determining messaging services offered by a telecommunications service provider are enabled to facilitate an exchange of communication data between a first user device associated with a first user that is physically located in an aircraft and associated with a connectivity services service provider and at least one second user device associated with a second user. The technologies described herein can include, based at least partly on determining that the messaging services are enabled, receiving communication data from the first user device, accessing presence data from the first user device, sending the communication data to the at least one second user device, and causing the presence data to be presented on the at least one second user device.

19 Claims, 6 Drawing Sheets

(56) References Cited

U.S. PATENT DOCUMENTS

| | | | | |
|---|---|---|---|---|
| 2010/0122183 | A1* | 5/2010 | Babaian | H04W 4/02 |
| | | | | 715/752 |
| 2010/0273509 | A1* | 10/2010 | Sweeney | G06Q 10/02 |
| | | | | 455/456.3 |
| 2012/0003989 | A1* | 1/2012 | Gravino | H04W 4/21 |
| | | | | 455/456.1 |
| 2015/0026269 | A1* | 1/2015 | Canton | H04L 51/04 |
| | | | | 709/206 |
| 2015/0200981 | A1* | 7/2015 | Garrick | H04L 43/10 |
| | | | | 709/204 |
| 2015/0350996 | A1* | 12/2015 | Lauer | H04W 40/02 |
| | | | | 370/328 |

* cited by examiner

SOCIAL PRESENCE

RELATED APPLICATIONS

This application claims the benefit of U.S. Provisional Application No. 62/072,301 filed on Oct. 29, 2014, entitled "Social Presence," the entire contents of which are incorporated herein by reference.

BACKGROUND

Generally, people can communicate with each other via devices that are communicatively coupled by various networks. This can include sending text messages, multimedia messages, etc. over the various networks. However, certain situations, such as flight, result in restricted access to some networks due to regulations associated with aircrafts and/or limited opportunities for network connections. Accordingly, during flight, people are not able to communicate with each other via their devices.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
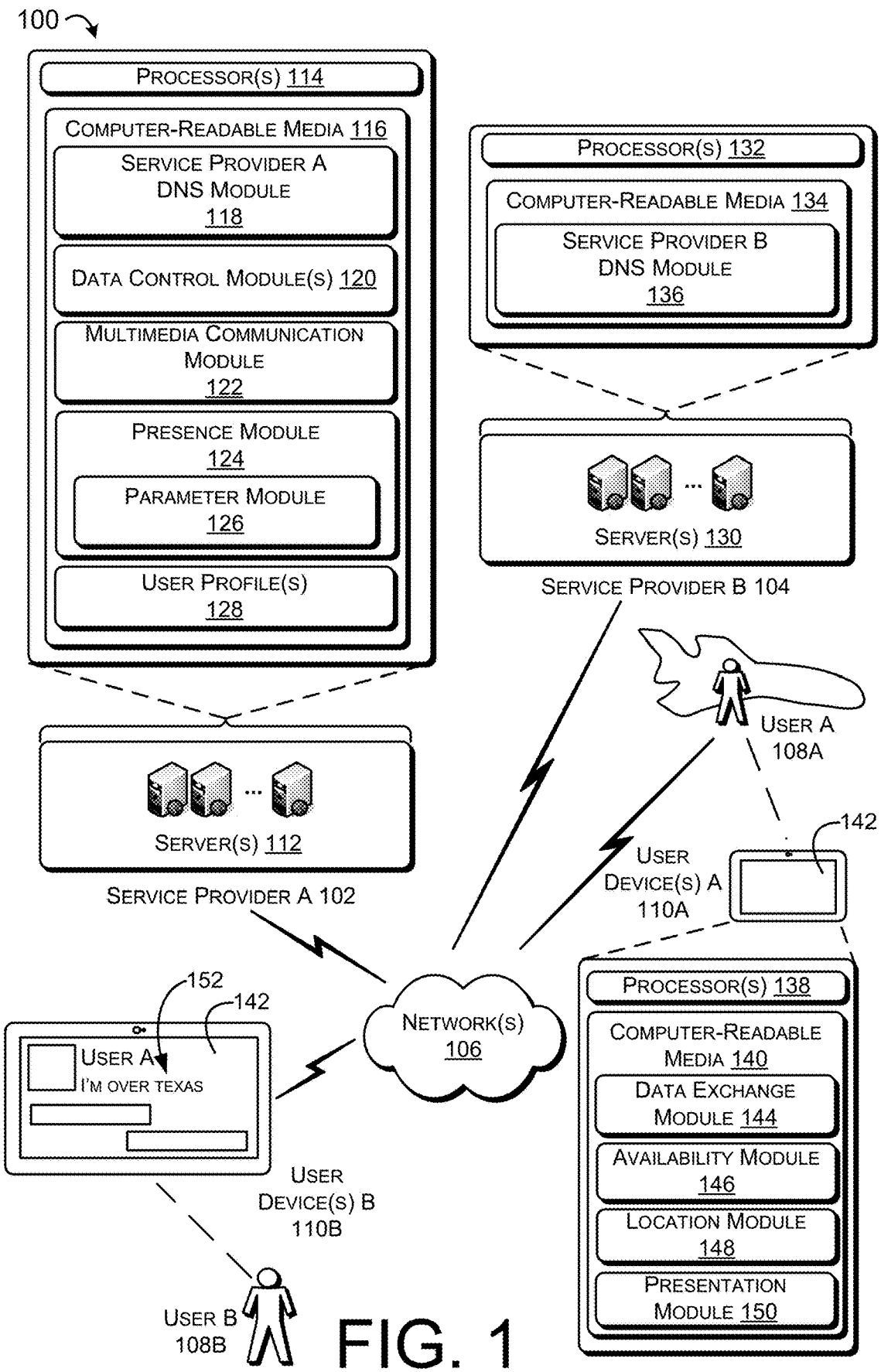
FIG. 1 is a schematic diagram showing an example environment for publishing social presence data associated with users in flight to other users associated with messaging services.

This disclosure describes technologies for publishing social presence data associated with users in flight to other users associated with messaging services offered by telecommunications service providers. In some examples, a first user can publish the social presence data directly to a second user via a corresponding user device. In other examples, a first user can publish the social presence data to more than one second user via corresponding user devices. Social presence data can be information for other users (e.g., buddies, contacts, etc.) to learn what a user is doing, where the user is located, a mood of the user, a status of the user, etc. For illustrative examples, as described below, social presence data can describe a location of a user, an availability of a user, personal information about a user, etc.

In at least one example, a first user who is physically present in an aircraft can enable messaging services offered by a telecommunications service provider to enable an exchange of communication data between a first user device and at least one second user device. The first user can have a user profile associated with a telecommunications services provider offering the messaging services. In at least one example, the messaging services can correspond to advanced communication services (e.g., Rich Communication Suite, etc.). The advanced communication services can be discoverable and interoperable. The first user can initiate the enabling by accessing a connectivity services service provider via signing onto an account associated with the connectivity services service provider. The first user can access the connectivity services service provider for enabling the messaging services from the aircraft and, based at least in part on enabling the messaging services, can send and/or receive communication data to and/or from one or more second user devices while the aircraft is in flight. The communication data can include text messages, multimedia messages, voice messages represented by visual elements (e.g., visual voicemails), etc.

The one or more second user devices can be associated with second users and the second users can have user profiles associated with the telecommunications service provider. That is, the first user and the second users can be associated with a same telecommunications service provider. In some examples, the second users can be on the ground (i.e., not in an aircraft). In such examples, the second users can exchange communication data without signing onto an account associated with the connectivity services service provider. That is, the second users can utilize the messaging services offered by the telecommunications service provider without accessing the connectivity services service provider. In other examples, at least one of the second users can be in an aircraft. In such examples, like the first user, the at least one of the second users can exchange communication data based at least in part on signing onto an account associated with the connectivity services service provider.

The technologies described herein can include determining presence data associated with the first user and/or first user device. The presence data can include location data, availability data, personal data, etc. In some examples, location data can include data identifying a geographical location on Earth corresponding to the location of the first user device in the air. In at least one example, the location of the aircraft can serve as a proxy for the location of the first user device. As described below, the location data can be determined by one or more location devices associated with the aircraft and/or first user device. The location data can include various levels of accuracy. For instance, the location data can refer to a region, a continent, a country, a state, a city, a street, a landmark, etc. corresponding to the location of the aircraft and/or first user device in the air. In other examples, location data can include data indicating that the first user is in an aircraft, on the ground, etc.

Availability data can include data indicating whether the first user is available, unavailable, in a meeting, etc. Availability data can be determined based at least in part on detecting interactions between the first user and the first user device, accessing an electronic calendar corresponding to the first user, receiving data manually input by the first user, etc.

Personal data associated with the first user can include data indicating a birthday, anniversary, or other notable date associated with the first user. Another notable date can correspond to a date that has significance to the user but might not have significance to others. Personal data can be determined based at least in part on accessing an electronic calendar corresponding to the first user, receiving data manually input by the first user, accessing a user profile associated with the first user, etc.

Additionally and/or alternatively, personal data can include data indicating a mood of a user, for instance, whether the user is happy, sad, stressed, excited, etc. In some examples, such personal data can be determined based at least in part on receiving permission to access messaging information, information associated with third-party service providers (e.g., social media platforms, etc.), etc., accessing the messaging information, the information associated with third-party service providers, etc., and mining the messaging information, information associated with third-party service providers, etc. for sentiment. For instance, in a non-limiting example, based at least in part on mining a text conversation, a service provider can identify a number of emoticons associated with sad sentiment and/or words semantically associated with sad sentiment. As a result, the service provider can determine that the user is sad. Such personal data can be published as presence data described herein.

The presence data can be presented on the one or more second user devices. Presence data can be presented as text elements, graphical elements, combinations of the foregoing, etc. In a non-limiting example, the technologies described herein can cause a text element indicating that the first user is on an aircraft to be presented. In other non-limiting examples, the technologies described herein can cause a graphical element indicating that the first user is on the aircraft to be presented. Additionally and/or alternatively, as a non-limiting example, the technologies described herein can cause a text element indicating the geographical location of first user to be presented. In other non-limiting examples, the technologies described herein can cause a graphical element such as a map, image, graphic, corresponding to the geographical location of the first user to be presented. Additional and/or alternative information, as described below, can be presented on the one or more second user devices.

Publishing presence data to the second users can provide the second users with additional information about the first user. In some examples, the presence data can enhance the communication experience between the first user and the second users. For instance, second users can leverage the presence data to identify best times to contact the first user (e.g., when the user is available) or when to avoid contacting the first user (e.g., when the user is unavailable and/or in a meeting). Or, second users can wish the first user a "happy birthday" based on learning that it is the first user's birthday per the presence data. Additionally and/or alternatively, second users can identify where the first user is to determine whether they are out of the office, where they are travelling to, etc. In other examples, the presence data can be used in emergency situations. For instance, if an aircraft crashes, emergency personnel can leverage presence data for identifying the location of the aircraft via the location data, time data associated with the location data, etc.

FIG. 1 is a schematic diagram showing an example environment 100 for publishing social presence data associated with users in flight to other users associated with messaging services. More particularly, the example environment 100 can include service providers, including service provider A 102 and service provider B 104, one or more network(s) 106, users 108 (e.g., user A 108A, user B 108B, etc.), and user devices 110 associated with the users 108 (e.g., user device A 110A, user device(s) B 110B, etc.).

A service provider can be any entity, server(s), platform, etc., that facilitates communication between users 108. In at least one example, service provider A 102 can be associated with a telecommunications service provider for providing various services such as messaging services (e.g., instant messaging/chat, SMS messaging, MMS messaging, etc.), video calling services, voice calling services, etc. Examples of telecommunications service providers include T-MOBILE®, VERIZON WIRELESS®, AT&T®, etc. In at least one example, service provider B 104 can be associated with connectivity services. Examples of connectivity services service providers include GOGO®, COMCAST®, etc. Service provider A 102 and/or service provider B 104 can be implemented in non-distributed computing environments or can be implemented in distributed computing environments, possibly by running some modules on user devices 110 or other remotely located devices.

As shown, service provider A 102 can include one or more server(s) 112, which can include one or more processing unit(s) 114 and computer-readable media 116, such as memory. The memory can include one or more modules and data structures, such as a domain name server (DNS) module (service provider A DNS module 118), a data control module(s) 120, a multimedia communication module 122, a presence module 124 including a parameter module 126, a user profile(s) 128, and user profile(s) 128. The one or more modules and data structures can be configured to manage interactions between the user devices 110 and/or the service providers (e.g., service provider A 102, service provider B 104, etc.). The one or more modules and data structures can be in the form of stand-alone applications, productivity applications, an operating system component or any other application or software module having features that facilitate interactions between the user devices 110 and/or the service providers (e.g., service provider A 102, service provider B 104, etc.).

In various examples, service provider A 102 can facilitate enabling messaging services offered by a telecommunications service provider to facilitate an exchange of communication data between a first user device (e.g., user device A 110A) and at least one second user device (e.g., user device(s) B 110B, etc.). Based at least in part on enabling the messaging services, service provider A 102 can manage the exchange of communication data between the first user device (e.g., user device A 110A) and the at least one second user device (e.g., user device(s) B 110B). Additionally, service provider A 102 can receive, access, and/or determine presence data associated with the first user (e.g., user A 108A) and/or first user device (e.g., user device A 110A) and cause the presence data to be presented (i.e., published) on second user devices (e.g., user device(s) B 110B, etc.).

Furthermore, as shown, service provider B 104 can include one or more server(s) 130, which can include one or more processing unit(s) 132 and computer-readable media 134, such as memory. The memory can include one or more modules and data structures, such as a DNS module (service provider B DNS module 136), etc. The one or more modules and data structures can be configured to manage interactions between the user devices 110 and/or the service providers (e.g., service provider A 102, service provider B 104, etc.). The one or more modules and data structures can be in the form of stand-alone applications, productivity applications, an operating system component or any other application or software module having features that facilitate interactions between the user devices 110 and/or the service providers (e.g., service provider A 102, service provider B 104, etc.). In various examples, service provider B 104 can facilitate enabling the messaging services offered by the telecommunications service provider (e.g., service provider A 102) to enable the exchange of communication data between the first user device (e.g., user device A 110A) and at least one second user device (e.g., user device(s) B 110B).

The network(s) 106 can facilitate communication between the user devices 110 and/or the service providers (e.g., service provider A 102, service provider B 104, etc.). In some examples, the network(s) 106 can be any type of network known in the art, such as the Internet. Moreover, the user devices 110 can communicatively couple to the network(s) 106 in any manner, such as by a global or local wired or wireless connection (e.g., local area network (LAN), intranet, etc.). In addition, the user devices 110 can communicate using any other technology such as BLUETOOTH, NFC, or any other suitable light-based, wired, or wireless technology. It should be appreciated that many more types of connections can be utilized than illustrated in FIG. 1.

Returning to the service providers (e.g., service provider A 102 and/or service provider B 104), examples support scenarios where device(s) represented in the one or more server(s) 112 and/or 130 can include one or more computing devices that operate in a cluster or another clustered configuration to share resources, balance load, increase performance, provide fail-over support or redundancy, or for other purposes. Device(s) represented in the one or more server(s) 112 and/or 130 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Device(s) represented in the one or more server(s) 112 and/or 130 can include any type of computing device having one or more processing unit(s) 114 and/or 132 operably connected to computer-readable media 116 and/or 134 such as via a bus, which in some instances can include one or more of a system bus, a data bus, an address bus, a PCI bus, a Mini-PCI bus, and any variety of local, peripheral, and/or independent buses. Executable instructions stored on computer-readable media 116 and/or 134 can include, for example, the domain name server (DNS) modules (service provider A DNS module 118 and/or service provider B DNS module 136), the data control module(s) 120, the multimedia communication module 122, the presence module 124 including the parameter module 126, the user profile(s) 128, etc. and other modules, programs, or applications that are loadable and executable by processing units(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that can be included in the one or more server(s) 112 and/or 130 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

As illustrative examples corresponding to the service providers (e.g., service provider A 102, service provider B 104, etc.) and/or the user devices 110, processing unit(s) 114, 132, and/or 138 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 114 and/or 132 can execute one or more modules and/or processes to cause the server(s) 112 and/or 130 to perform a variety of functions, as set forth above and explained in further detail in the following disclosure. In additional and/or alternative examples, the processing unit(s) 138 can execute one or more modules and/or processes to cause the devices 110 to perform a variety of functions, as set forth above and explained in further detail in the following disclosure. Additionally, each of the processing unit(s) 114, 132, and/or 138 can possess its own local memory, which also can store program modules, program data, and/or one or more operating systems.

In at least one configuration, the computer-readable media 116 and/or 132 of the server(s) 112 and/or 130 can include components that facilitate interaction between the service providers 102 (e.g., service provider A 102, service provider B 104, etc.) and the users 108. The components can represent pieces of code executing on a computing device. For example, the computer-readable media 116 and/or 132 can include the domain name server (DNS) modules (service provider A DNS module 118 and/or service provider B DNS module 136), the data control module(s) 120, the multimedia communication module 122, the presence module 124 including the parameter module 126, the user profile(s) 128, etc. In at least some examples, the modules can be implemented as computer-readable instructions, various data structures, and so forth via at least one processing unit(s) 112 to configure a device to execute instructions and to perform operations described herein. Functionality to perform these operations can be included in multiple devices or a single device.

The DNS modules convert domain names to internet protocol (IP) addresses. Service provider B 104 can include a DNS module (e.g., service provider B DNS module 136) for receiving DNS queries. In at least one example, the DNS queries can be domain names. The service provider B DNS module 136 can be configured to resolve the DNS queries. Resolving the DNS queries can include converting domain names to IP addresses. The service provider B DNS module 136 can forward DNS queries associated with service provider A 102 to service provider A 102. Service provider A 102 can include a DNS module (e.g., service provider A DNS module 118) for resolving the DNS queries. Based at least in part on resolving the DNS queries associated with service provider A 102, the service provider A DNS module 118 can route data (e.g., communication data) to the data control module(s) 120.

The data control module(s) 120 can include various stand-alone applications, productivity applications, an operating system component or any other application or software module having features that process communication data. In at least one example, the data control module(s) 120 can process the communication data to determine a source of the communication data and/or a type of the communication data (e.g., a voice call, a voice message represented by a visual element, a text message, a multimedia message, etc.). The data control module(s) 120 can include evolved packet data gateways (ePDGs), a session border controllers (A-SBCs), etc. In at least one example, the ePDGs can serve to secure data transmission between user devices 110 in untrusted networks. Additionally and/or alternatively, A-SBCs can serve to manage the exchange of data between the user devices 110 and the service providers (e.g., service provider A 102, service provider B 104, etc.).

The communication data can be associated with metadata including information about the communication data. For instance, the metadata can indicate a source of the communication data, a destination of the communication data, a format of communication data, etc. In at least one example, the metadata can correspond to session description protocol and the data control module(s) 120 can analyze session description protocol to determine information about the communication data. In some examples, particular service providers can be permitted to transmit some formats of communication, but not other formats of communication data. In other examples, the data control module(s) 120 can send all communication data to the intended recipient(s) (e.g., user B 108B, etc.).

In at least one example, the communication data can include a session initiation protocol request inviting a user device (e.g., user device A 110A, user device(s) B 110B, etc.) to participate in a call session. In the at least one example, the data control module(s) 120 can analyze the description of the communication data and can determine that the communication data is associated with a particular service provider (e.g., service provider B 104) and that the communication data is associated with a description that includes audio/video. Based at least in part on determining that the description includes audio/video, the data control module(s) 120 can block the exchange of the communication data. That is, the data control module(s) 120 can determine that the communication data is associated with a voice call and can terminate the communication data from being sent to the intended recipient(s) (e.g., user B 108B, etc.). In other examples, the data control module(s) 120 can determine that the communication data is associated with a voice call and can forward the communication data to the intended recipient(s) (e.g., user B 108B, etc.)

In other examples, the communication data can include a session initiation protocol request inviting a user device (e.g., user device A 110A, user device(s) B 110B, etc.) to receive a message. In at least one example, the data control module(s) 120 can analyze the description of the communication data and can determine that the communication data is associated with a particular service provider (e.g., service provider B 104) and that the communication data is associated with a description that includes text, multimedia, visual voicemail content, etc. Based at least in part on determining that the description includes text, multimedia, visual voicemail content, etc., the data control module(s) 120 can facilitate the exchange of the communication data. That is, the data control module(s) 120 can determine that the communication data is not associated with a voice call and can enable the communication data to be sent to the intended recipient(s) (e.g., user B 108B, etc.).

The multimedia communication module 122 can manage the exchange of communication data between user devices 110. In at least one example, the multimedia communication module 122 can include various stand-alone applications, productivity applications, an operating system component or any other application or software module having features that manage the exchange of communication data between user devices 110. The multimedia communication module 122 can correspond to an IP multimedia subsystem. The IP multimedia subsystem can manage the use of IP for sending and/or receiving communication data over a network. In at least one example, the multimedia communication module 122 can facilitate such communications as telephony, fax, e-mail, Internet access, Web services, voice over IP (VoIP), instant messaging (IM), videoconference sessions, video on demand (VoD), etc. The multimedia communication module 122 can receive communication data from the data control module(s) 120 and can route the communication data to the intended recipient(s) (e.g., user device A 110A, user device(s) B 110B, etc.).

The presence module 124 can receive, access, and/or determine presence data associated with users 108. As described above, the presence data can include location data, availability data, personal data, etc. The location data can be determined by one or more location devices associated with the aircraft and/or a user device (e.g., user device A 110A) and/or manually input by users 108. The location devices and/or users 108 can provide location data to the location module 148, as described below. The location devices can determine location data based at last in part on determining a position of a user device (e.g., user device A 110A) in a coordinate space and translating the position to a location on a map. In such examples, the user device (e.g., user device A 110A) can send location data to the presence module 124. The location devices can provide location data to the location module 148 in regular intervals of time (e.g., after a lapse of a second, a minute, five minutes, an hour, etc.), at a particular frequency, responsive to a user (e.g., user A 108A) sending and/or receiving communication data, responsive to an occurrence of an event triggering the collection of updated location data, etc.

In other examples, the presence module 124 can determine location data. For instance, in examples where the location data can include data indicating that a user (e.g., user A 108A) is in an aircraft, on the ground, etc., the presence module 124 can determine that the location data is changing at a rate consistent with a speed of an aircraft. Accordingly, the presence module 124 can infer that the user (e.g., user A 108A) is on an aircraft. As such, the presence module 124 can determine that the user (e.g., user A 108A)

is on an aircraft. Or, the presence module 124 can determine that the user (e.g., user A 108A) signed onto an account associated with a service provider (e.g., service provider B 104) that is exclusively associated with connectivity services offered on aircrafts, the presence module 124 can infer that the user (e.g., user A 108A) is on an aircraft. As such, the presence module 124 can determine that the user (e.g., user A 108A) is on an aircraft. In additional and/or alternative examples, the user (e.g., user A 108A) can manually indicate that they are on an aircraft. For instance, the presence module 124 can determine that the user (e.g., user A 108A) actuated a control associated with a user interface presented via a user device (e.g., user device A 110A) to indicate that the user (e.g., user A 108A) is on an aircraft, etc.

Moreover, presence data can include availability data. Availability data can include data indicating whether a user (e.g., user A 108A) is available, unavailable, in a meeting, etc. In some examples, the presence module 124 can receive availability data from the user devices 110. For instance, the availability module 146, described below, can determine whether a user (e.g., user A 108A) is available based at least in part on interactions between the user (e.g., user A 108A) and a corresponding user device (e.g., user device A 110A), accessing an electronic calendar corresponding to the user (e.g., user A 108A), receiving data manually input by the user (e.g., user A 108A), etc. In such examples, the user device (e.g., user device A 110A) can send availability data to the presence module 124. In other examples, the presence module 124 can determine whether a user (e.g., user A 108A) is available based at least in part on interactions between the user (e.g., user A 108A) and a corresponding user device (e.g., user device A 110A), accessing an electronic calendar corresponding to the user (e.g., user A 108A), receiving data manually input by the user (e.g., user A 108A), etc.

Additionally and/or alternatively, presence data can include personal data associated with the users 108. The personal data can include data indicating a birthday, anniversary, or other notable date associated with a user (e.g., user A 108A). In some examples, the presence module 124 can determine personal data based at least in part on accessing an electronic calendar corresponding to a user (e.g., user A 108A), receiving data manually input by the user (e.g., user A 108A) and/or received from third party service providers, etc. As described above, personal data can include data indicating a mood of a user, for instance, whether the user is happy, sad, stressed, excited, etc. In at least one example, the presence module 124 can access data stored in user profiles 128 to determine personal data.

The parameter module 126 can include data associated with one or more parameters for managing the publication of presence data. In at least one example, a parameter can be associated with a time that presence data is published and/or events triggering updates to the presence data. For instance, a parameter can determine that presence data can be published after a successful registration/sign-on to a network, a factory data reset, after switching remote administration tools (RATs), after detecting changes to capabilities (e.g., enabling/disability video calling), after sending/receiving communication data, etc. A parameter can determine a length of time that presence data is published (e.g., length of time before the presence data expires), a frequency in which presence data is updated, a regularity in which presence data is updated (e.g., length of time that lapses between receiving updates), etc. In an additional and/or alternative example, a parameter can be associated with how presence data is published to other users 108. For instance, a parameter can determine whether a user (e.g., user A 108A, user B 108B, etc.) prefers to publish textual elements, graphical elements, a combination of textual and graphical elements, etc. A parameter can determine particular user profiles 128 that are authorized to receive presence data from particular users (e.g., user A 108A, user B 108B, etc.). In at least some examples, the parameters are determined based at least in part on data associated with the user profiles 128, described below.

User profile(s) 128 can receive, access, and/or determine data associated with users 108. The data can be mapped to and/or otherwise associated with individual profiles that correspond to individual users (e.g., user A 108A, user B 108B, etc.). The profiles that correspond to the individual users (e.g., user A 108A, user B 108B, etc.) each can be associated with unique identifiers. One or more user devices 110 can be associated with an individual profile corresponding to the unique identifier. The user profile(s) 128 can receive data associated with the one or more users 108 from the one or more users 108 and/or on behalf of the one or more users 108 and/or access data associated with one or more users 108 via third party sources and systems (e.g., social networks, professional networks, etc.). In some examples, one or more users 108 can input data when they set up their profile for interacting with service provider A 102, in response to a prompt for data, etc. In at least one example, the data can include an alias associated with a user (e.g., user A 108A, user B 108B, etc.), a graphical element (e.g., image, graphic, etc.) associated with the user (e.g., user A 108A, user B 108B, etc.), personal data associated with the user (e.g., user A 108A, user B 108B, etc.), etc. As described above, personal data can include birthdays, anniversaries, and/or other notable dates. Personal data can include data indicating a mood of a user (e.g., user A 108A, user B 108B, etc.). Personal data can include additional and/or alternative information including, but not limited to, a number of children that a user (e.g., user A 108A, user B 108B, etc.) has, types of pets a user (e.g., user A 108A, user B 108B, etc.) has, a profession of a user (e.g., user A 108A, user B 108B, etc.), etc.

In some examples, the user profiles 128 can include data described above in the context of the parameters. That is, in at least some examples, users 108 can determine a time presence data is published, events triggering updates to the presence data, a length of time that presence data is published (e.g., length of time before the presence data expires), a frequency in which presence data is updated, a regularity in which presence data is updated (e.g., length of time that lapses between receiving updates), etc. In an additional and/or alternative example, user profiles 128 can define how presence data is published to other users 108, whether the user (e.g., user A 108A, user B 108B, etc.) prefers to publish textual elements, graphical elements, a combination of textual and graphical elements, etc., etc.

In order to enable users 108 to control the content of the presence data that can be published to other users 108, users 108 can determine which other users 108 are authorized to view published presence data. The user profiles 128 can identify particular user profiles 128 corresponding to particular users 108 that are authorized to receive presence data from particular users (e.g., user A 108A, user B 108B, etc.). For instance, data associated with the user profiles 128 can indicate users 108 that are authorized view published presence data. In some examples, users 108 can correspond to contacts in a contacts list associated with a first user profile (e.g., user A 108A). Each of the contacts can have user profiles stored in the user profiles 128 associated with the service provider A 102. In some examples, individual contacts can have more than one user device associated with their user profile. In such examples, the presence data can be published on all user devices associated with the user profile.

In at least one example, the first user (e.g., user A 108A) can indicate which of the contacts on the contact list are authorized to view published presence data. For instance, the first user (e.g., user A 108A) can interact with the contact list such to indicate that particular contacts on the contact list are authorized to view the published presence data. In some examples, the first user (e.g., user A 108A) can identify contacts on the contact list that are authorized to view published presence data and the first user device (e.g., user device A 110A) can send an invitation to the identified contacts. The contacts list can identify other users (e.g., user B 108B) who have user profiles with a same the telecommunications service provider (e.g., service provider A 102) and/or who otherwise have connections with the first user (e.g., user A 108A) via another service provider. The invitation can include an invitation to view published presence data. Based at least in part on the identified contacts accepting the invitation, the identified contacts can be authorized to view the first user's (e.g., user A 108A) presence data. In other examples, the first user device (e.g., user device A 110A) can receive and accept an invitation from other contacts. Based at least in part on accepting the invitation, the first user (e.g., user A 108A) can view presence data associated with the contacts and the contacts can view the presence data associated with the first user (e.g., user 108A). In additional and/or alternative examples, users 108 can identify some contacts that can view additional and/or alternative presence data than other contacts.

In additional and/or alternative examples, the first user (e.g., user A 108A) can revoke contacts' access to published presence data by indicating which of the contacts on the contact list are no longer authorized to view published presence data. For instance, the first user (e.g., user A 108A) can interact with the contact list such to indicate that particular contacts on the contact list are not authorized to view the published presence data. In some examples, the first user (e.g., user A 108A) is capable of viewing presence data associated with users 108 (e.g., contacts) that have authorized the first user (e.g., user A 108A) to view their presence data even though the users 108 (e.g., contacts) are not authorized to view the first users (e.g., user A 108A) presence data.

In some examples, the users 108 can operate corresponding user devices 108 to perform various functions associated with the user devices 110, which can include one or more processing unit(s) 138, computer-readable media 140, and a display 142. User device(s) 110 can represent a diverse variety of device types and are not limited to any particular type of device. Examples of user device(s) 110 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

In at least one configuration, the computer-readable media 140 of the user devices 110 can include components that facilitate interaction between the service providers 102 (e.g., service provider A 102, service provider B 104, etc.) and the users 108. The components can represent pieces of code executing on a computing device. For example, the computer-readable media 140 can include a data exchange module 144, an availability module 146, a location module 148, a presentation module 150, etc. In at least some examples, the modules can be implemented as computer-readable instructions, various data structures, and so forth via at least one processing unit(s) 138 to configure a device to execute instructions and to perform operations described herein. Functionality to perform these operations can be included in multiple devices or a single device.

The data exchange module 144 can be configured to send and/or receive communication data to and/or from other user devices 110 (e.g., user device(s) B 110B) via the network(s) 106 and/or service providers (e.g., service provider A 102, service provider B 104, etc.). The communication data can include text messages, multimedia messages (e.g., picture messages, video messages, etc.), voice messages represented by visual elements (e.g., visual voicemails), etc.

The availability module 146 can be configured to determine whether a user is available, unavailable, in a meeting, etc. The availability module 146 can determine whether a user (e.g., user A 108A) is available based at least in part on interactions between the user (e.g., user A 108A) and a corresponding user device (e.g., user device A 110A), accessing an electronic calendar corresponding to the user (e.g., user A 108A), receiving data manually input by the user (e.g., user A 108A), etc. For instance, based at least in part on analyzing user interactions with a user device (e.g., user device A 110A), the availability module 146 can determine that the user (e.g., user A 108A) is interacting with his or her user device (e.g., user device A 110A) such that the user (e.g., user A 108A) is available or that the user (e.g., user a 108A) interacted with his or her user device (e.g., user device A 110A) within a threshold of time indicating that the user (e.g., user A 108A) is available. Alternatively, based at least in part on analyzing user interactions with a user device (e.g., user device A 110A), the availability module 146 can determine that the user (e.g., user A 108A) has not interacted with his or her user device (e.g., user device A 110A) in a period of time that exceeds a threshold amount of time such that the user (e.g., user A 108A) is not available. In additional and/or alternative examples, the availability module 146 can analyze applications that the user (e.g., user A 108A) is interacting with such to determine whether the user (e.g., user A 108A) is available. In some examples, the user (e.g., user A 108A) can grant the availability module 146 access to his or her electronic calendar so that the availability module 146 can determine whether the user (e.g., user A 108A) has an appointment, indicating that the user (e.g., user A 108A) is unavailable and/or in a meeting, or does not have anything scheduled, indicating that the user (e.g., user A 108A) is available. Additional and/or alternative technologies can be leveraged to determine availability data. The user device (e.g., user device A 110A) can send availability data to the presence module 124.

As described above, the location module 148 can be configured to receive location data from location devices. The location data can be determined by one or more location devices associated with the aircraft and/or a user device (e.g., user device A 110A). In at least one example, a location device can be integral to a user device (e.g., user device A) (e.g., global positioning system (GPS) navigation system, etc.). In other examples, a location device can be associated with a network 106 access point on the aircraft (e.g., a router, etc.). The location devices can provide location data to the location module 148 at various times. For instance, the location devices can determine location data at regular intervals, a particular frequency, responsive to sending and/or receiving communication data, responsive to a triggering event, etc. In other examples, users (e.g., user A 108A, user B 108B, etc.) can input location data into the location module 148 based at least in part on interacting with a corresponding user device (e.g., user device A 110A, user device B 110B, etc.). For instance, a user (e.g., user A 108A, user B 108B, etc.) can indicate via touch input his or her location on a map. The user device (e.g., user device A 110A) can send location data to the presence module 124.

The presentation module 150 can be configured to receive presence data and cause graphical and/or textual elements corresponding to the presence data to be presented on a display 142 of a corresponding user device (e.g., user A 110A, user B 110B, etc.) as presence data. In at least one example, the presence module 124 can send the presence data and data corresponding to graphical and/or textual elements to the presentation module 150. The presentation module 150 can render the graphical and/or textual elements such to cause the presence data to be presented on the display 142. As a non-limiting example, in FIG. 1, user device(s) B 110B illustrates an example user interface including presence data represented by a textual element 152 that is presented on a display 142 of the user device(s) B 110B. Additional examples of graphical and/or textual elements that can be rendered by the presentation module 150 are shown and described in FIGS. 6A-6C below.

The computer-readable media 116, 134 and/or 138 can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Figure 2:
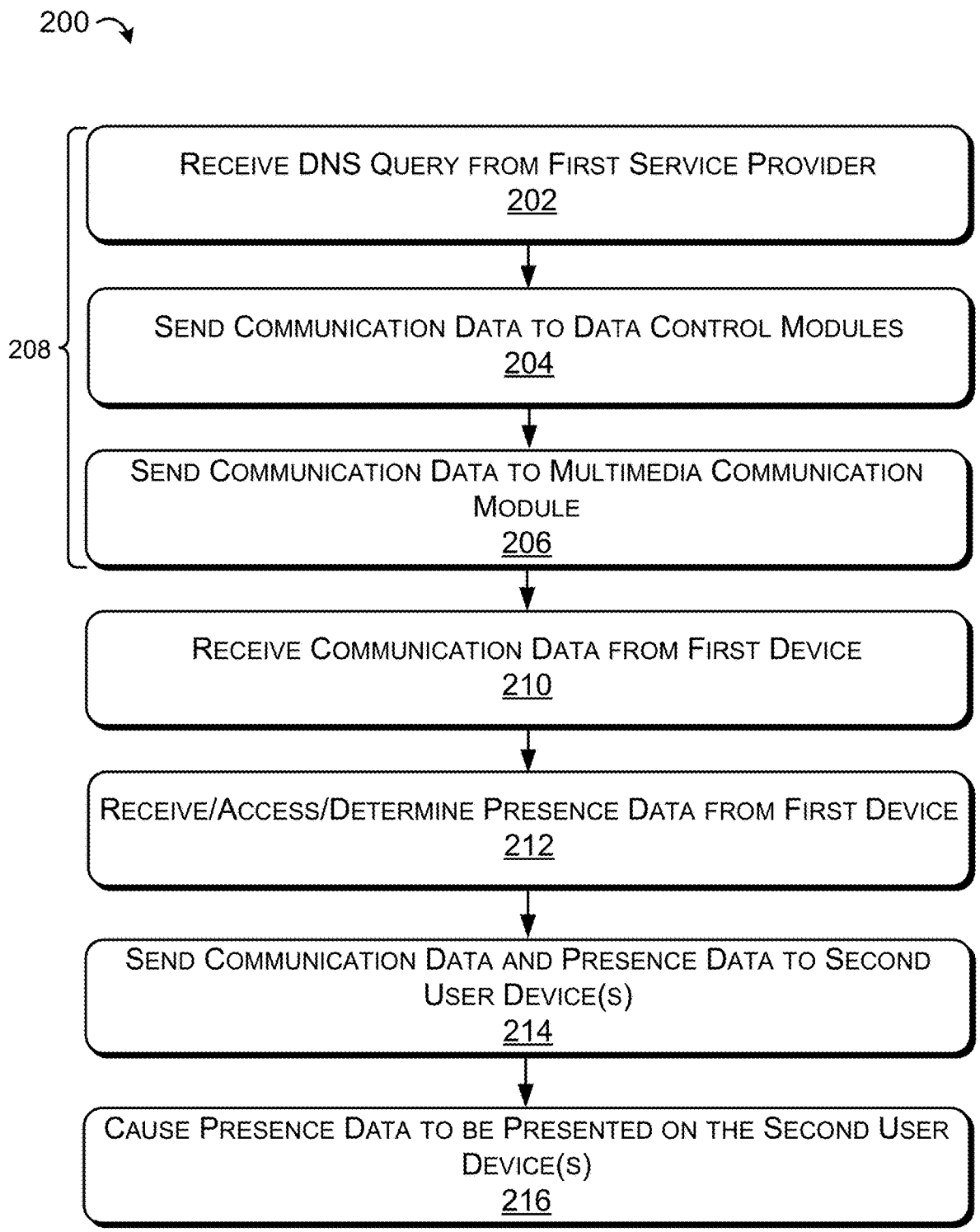
FIG. 2 is a flow diagram that illustrates an example process to cause social presence data associated with users in flight to be presented to other users associated with messaging services.

FIG. 2 is a flow diagram that illustrates an example process 200 to cause social presence data associated with users in flight (e.g., user A 108A) to be presented to other users (e.g., user B 108B, etc.) associated with messaging services. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

Block 202 illustrates receiving a DNS query from a first service provider (e.g., service provider B 104). The DNS modules convert domain names to IP addresses. As described above, service provider B 104 can include a DNS module (e.g., service provider B DNS module 136) for receiving DNS queries. In at least one example, the DNS queries can be domain names. The service provider B DNS module 136 can be configured to receive and resolve the DNS queries. The service provider B DNS module 136 can forward DNS queries associated with service provider A 102 to service provider A 102. Service provider A 102 can include a DNS module (e.g., service provider A DNS module 118) for resolving the DNS queries.

Block 204 illustrates sending communication data to a data control module 120. Based at least in part on resolving the DNS query, the service provider A DNS module 118 can route communication data to the data control module(s) 120. As described above, the data control module(s) 120 can analyze the description of the communication data.

Block 206 illustrates sending the communication data to the multimedia communication module 122. The multimedia communication module 122 can manage the exchange of communication data between user devices 110. As described above, the multimedia communication module 122 can correspond to an IP multimedia subsystem. The IP multimedia subsystem can manage the use of IP for sending and/or receiving communication data over a network (e.g., network(s) 106). In at least one example, based at least in part on receiving communication data from the data control module 120, the multimedia communication module 122 can enable the exchange of communications such as telephony, fax, e-mail, Internet access, Web services, voice over IP (VoIP), instant messaging (IM), videoconference sessions, video on demand (VoD), etc.

The operations described with respect to blocks 202-206 can be performed to enable messaging services offered by a service provider (e.g., service provider A 102) to facilitate an exchange of communication data between a first user device (e.g., user device A 110A) associated with a first user (e.g., user A 108A) that is physically located in an aircraft and at least one second user device (e.g., user device(s) B 110B, etc.). Blocks 202, 204, and 206 are collectively identified as group 208. In some examples, the operations described with respect to blocks 202-206 can be performed each time a user (e.g., user A 108A) enables the messaging services from a new aircraft. That is, each time a user (e.g., user A 108A) boards an aircraft, the user (e.g., user A 108A) can send a DNS query to a service provider (e.g., service provider B 110B) to initiate the enabling process. As a non-limiting example, each time a user (e.g., user A 108A) boards a new flight, the user (e.g., user A 108A) can send a request for www.gogoair.com to initiate the enabling process. In other examples, the operations described with respect to blocks 202-206 can be performed a first time, for instance, when a user (e.g., user A 108A) enables the messaging services from a new aircraft, and the user (e.g., user A 108A) may have access to the messaging services for a predetermined period of time. After the predetermined period of time expires, the user (e.g., user A 108A) can be prompted to re-enter his or her credentials associated with the service providers (e.g., service provider A 102, service provider B 104, etc.), initiate the enabling process again (e.g., by sending a new DNS query, etc.), etc.

Block 210 illustrates receiving communication data from a first user device (e.g., user device A 110A). As described above, the data exchange module 144 can be configured to send and/or receive communication data to and/or from other user devices 110 (e.g., user device(s) B 110B) via the network(s) 106 and/or service providers (e.g., service provider A 102, service provider B 104, etc.). The multimedia communication module 122 can receive the communication data from the data exchange module 114 and can route the communication data to the intended recipient (e.g., user device(s) B 110B).

Block 212 illustrates receiving/accessing/determining presence data. The presence module 124 can receive, access, and/or determine presence data associated with users 108, as described above. As described above, the presence data can include location data, availability data, personal data, etc.

Block 214 illustrates, sending the communication data and the presence data to the at least one second user device (e.g., user device(s) B 110B). The multimedia communication module 122 can send the communication data to at least one second user device (e.g., user device(s) B 110B). The presence module 124 can send presence data to at least one second user device (e.g., user device(s) B 110B). In some examples, the presence module 124 and the multimedia communication module 122 can send the communication data and the presence data at a same time. In other examples, the presence module 124 and the multimedia communication module 122 can send the communication data and the presence data at different times. For instance, the presence module 124 can send presence data each time a user (e.g., user device A 110A) sends communication data to the at least one second user device (e.g., user device(s) B 110B). Additionally and/or alternatively, the presence module 124 can send presence data at regular intervals of time, at a particular frequency, responsive to the occurrence of an event as described above, etc. In some examples, the timing associated with sending the presence data can be based at least in part on the parameters defined in the parameter module 126 and/or data associated with a corresponding user profile of the user profiles 128.

Figure 6A:
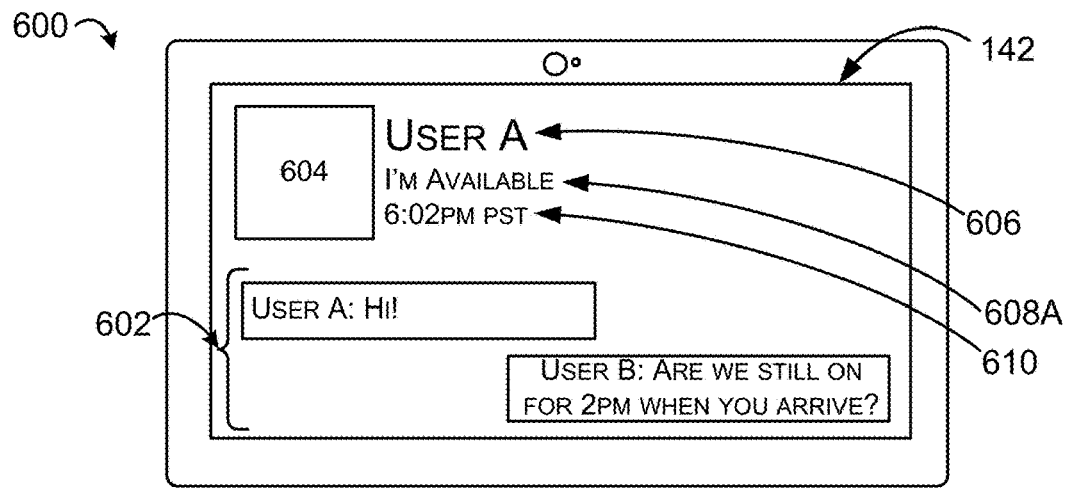
FIG. 6A is a schematic diagram showing an example user interface for presenting social presence data associated with users in flight to be presented to other users associated with messaging services.
Figure 6B:
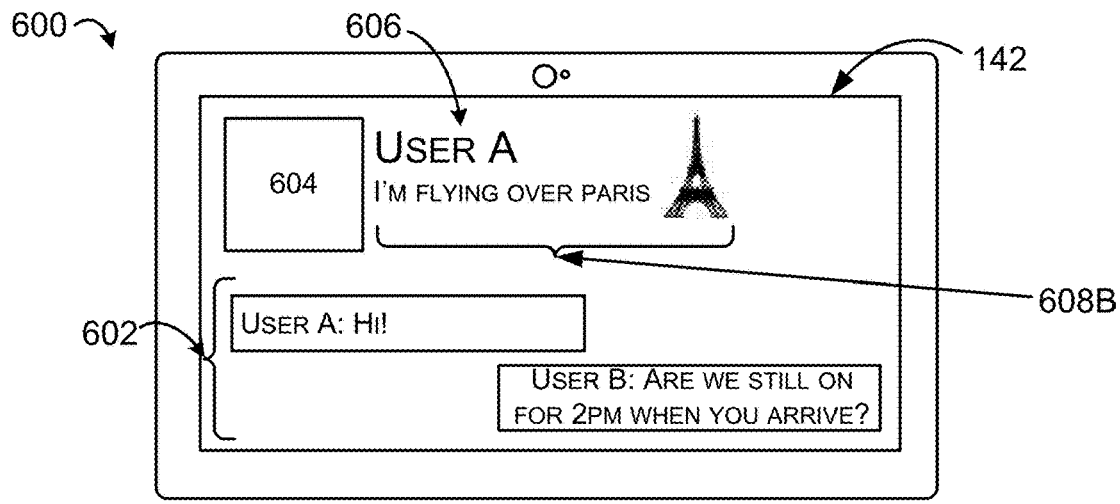
FIG. 6B is a schematic diagram showing another example user interface for presenting social presence data associated with users in flight to be presented to other users associated with messaging services.
Figure 6C:
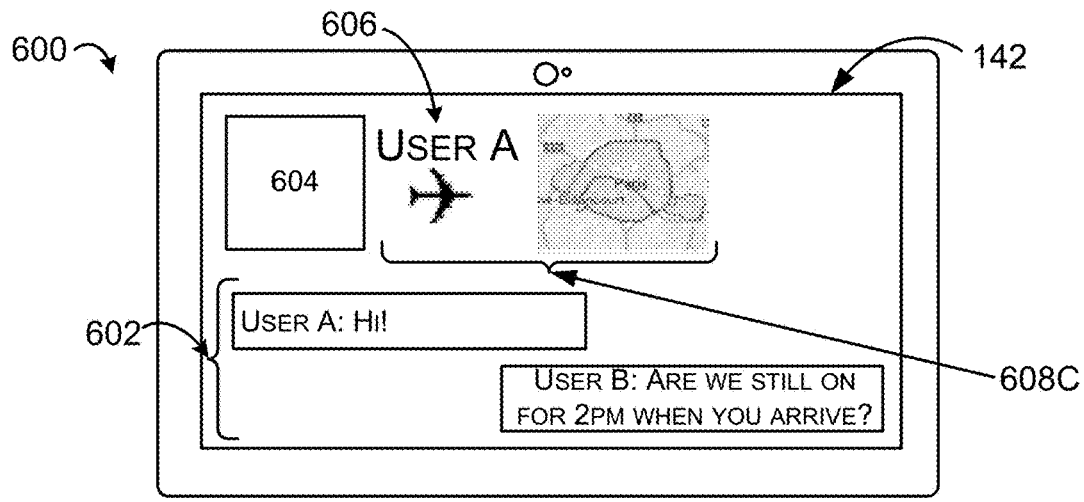
FIG. 6C is a schematic diagram showing yet another example user interface for presenting social presence data associated with users in flight to be presented to other users associated with messaging services.

Block 216 illustrates causing the presence data to be presented on the at least one second user device (e.g., user device(s) B 110B). The presentation module 150 can be configured to receive presence data and cause graphical and/or textual elements corresponding to the presence data to be presented on a display 142 of a corresponding user device (e.g., user A 110A, user B 110B, etc.). In at least one example, the presence module 124 can send the presence data and data corresponding to graphical and/or textual elements to the presentation module 150. The presentation module 150 can render the graphical and/or textual elements such to cause the presence data to be presented on the display 142. Examples of graphical and/or textual elements that can be rendered by the presentation module 150 are shown in FIGS. 6A-6C and described below.

Figure 3:
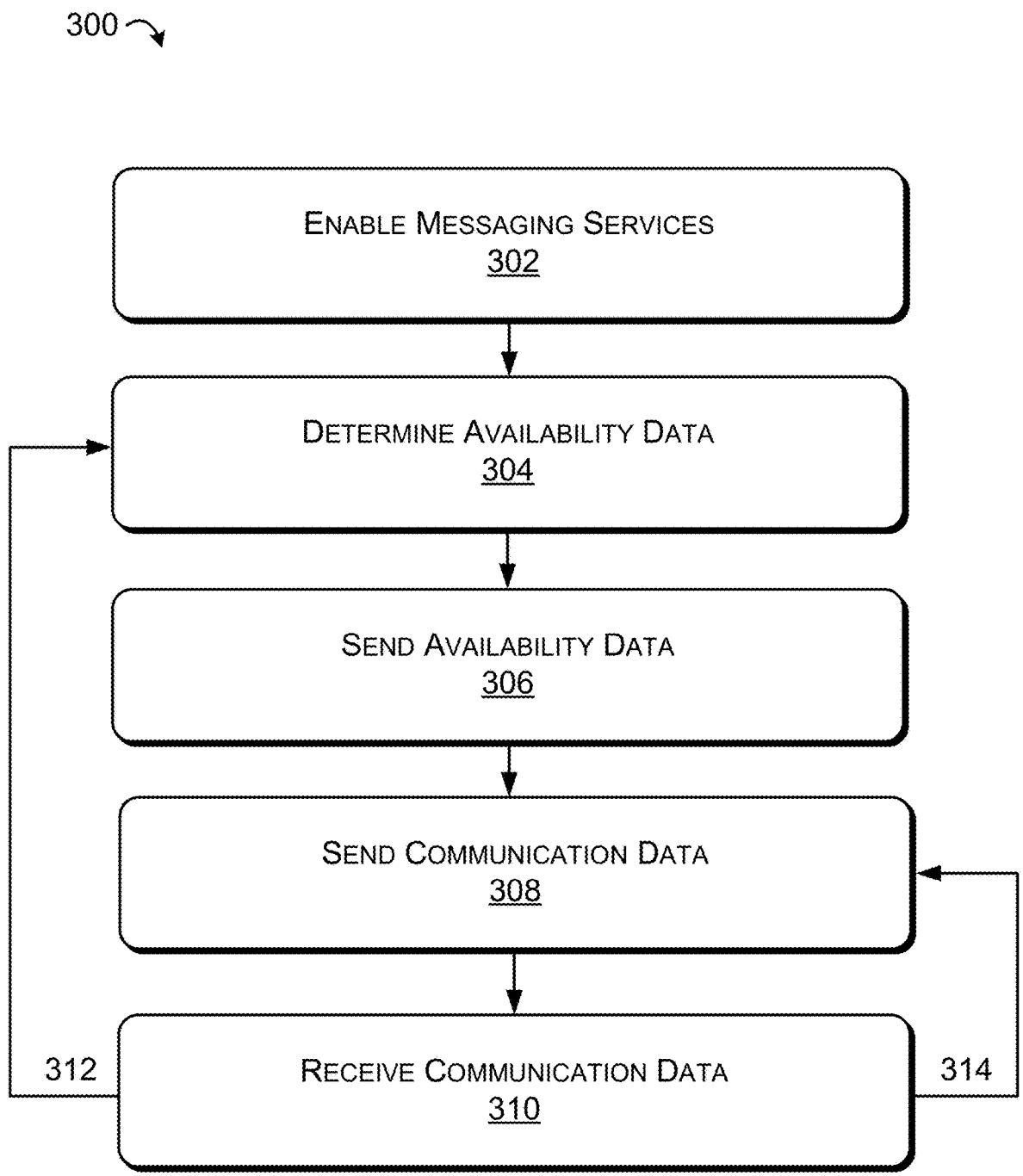
FIG. 3 is a flow diagram that illustrates an example process to cause availability information associated with users in flight to be presented to other users associated with messaging services.

FIG. 3 is a flow diagram that illustrates an example process 300 to cause availability information associated with users in flight (e.g., user A 108A) to be presented to other users (e.g., user B 108B, etc.) associated with messaging services. FIG. 3 can illustrate an example process 300 from the perspective of a first user device (e.g., user device A 110A) associated with a user in flight (e.g., user A 108A). As described above, it should be appreciated that more or fewer operations can be performed than shown in the FIGS. and described herein. These operations can also be performed in parallel, or in a different order than those described herein. Some or all of these operations might also be performed by components other than those specifically identified.

Block 302 illustrates enabling messaging services. From the perspective of a user device (e.g., user device A 110A), the first user device (e.g., user device A 110A) can send a DNS query to a first service provider (e.g., service provider B 104) to initiate the enabling. The first service provider (e.g., service provider B 104) can forward the DNS query to a second service provider (e.g., service provider A 102) to enable the messaging services as described above by the blocks associated with group 208.

Block 304 illustrates determining availability data. As described above, presence data can include availability data. Availability data can include data indicating whether a first user (e.g., user A 108A) is available, unavailable, in a meeting, etc. In some examples, the availability module 146 can determine whether a user (e.g., user A 108A) is available based at least in part on interactions between the user (e.g., user A 108A) and a corresponding user device (e.g., user device A 110A), accessing an electronic calendar corresponding to the user (e.g., user A 108A), receiving data manually input by the user (e.g., user A 108A), etc.

Block 306 illustrates sending availability data. The user device (e.g., user device A 110A) can send availability data to the presence module 124. In alternative examples, the presence module 124 can determine whether a user (e.g., user A 108A) is available based at least in part on interactions between the user (e.g., user A 108A) and a corresponding user device (e.g., user device A 110A), accessing an electronic calendar corresponding to the user (e.g., user A 108A), receiving data manually input by the user (e.g., user A 108A), etc.

In some examples, determining the availability data and/or sending the availability data can be based at least in part on sending communication data to at least one second user device (e.g., user device(s) B 110B). In other examples, determining the availability data and/or sending the availability data can be based at least in part on a regular interval, a particular frequency, etc. In at least one example, determining the availability data and/or sending the availability data can be based at least in part on one or more parameters stored in the parameter module 126 and/or data stored in the user profile(s) 128 described above.

Block 308 illustrates sending communication data. As described above, the data exchange module 144 can be configured to send and/or receive communication data to and/or from other user devices 110 (e.g., user device(s) B 110B) via the network(s) 106 and/or service providers (e.g., service provider A 102, service provider B 104, etc.). The multimedia communication module 122 can receive the communication data from the data exchange module 114 and can route the communication data to the intended recipient (e.g., user device(s) B 110B).

Block 310 illustrates receiving communication data. In at least some examples, the first user device (e.g., user device A 110A) can receive communication data from the one or more second user devices (e.g., user device(s) B 110B). In some examples, the communication data can be received responsive to the first user device (e.g., user device A 110A) sending communication data to the at least one second user device (e.g., user device(s) B 110B). In other examples, the communication data can be received from additional and/or alternative second user devices (e.g., user device(s) B 110B) and not responsive to the first user device (e.g., user device A 110A) sending communication data. The multimedia communication module 122 can manage the exchange of communication data between user devices 110. The multimedia communication module 122 can receive the communication data from at least one second user device (e.g., user device(s) B 110B) and can route the communication data to the intended recipient (e.g., user device A 110A).

Based at least in part on receiving communication data, as illustrated in block 310, the operations represented by blocks 304-310 can be repeated, as illustrated by line 312. That is, in some examples, the availability module 146 can determine availability data based at least in part on receiving communication data and can send updated availability data to the presence module 124 at a same or different time as the data exchange module 144 sends subsequent communication data to the multimedia communication module 122. In other examples, some of the operations represented in example process 300 can be repeated, as illustrated by line 314. That is, in some examples, the availability module 146 can delay determining availability data until a later time that is consistent with the one or more parameters, etc., and, based at least in part on receiving communication data, the data exchange module 144 can send subsequent communication data to the multimedia communication module 122.

Figure 4:
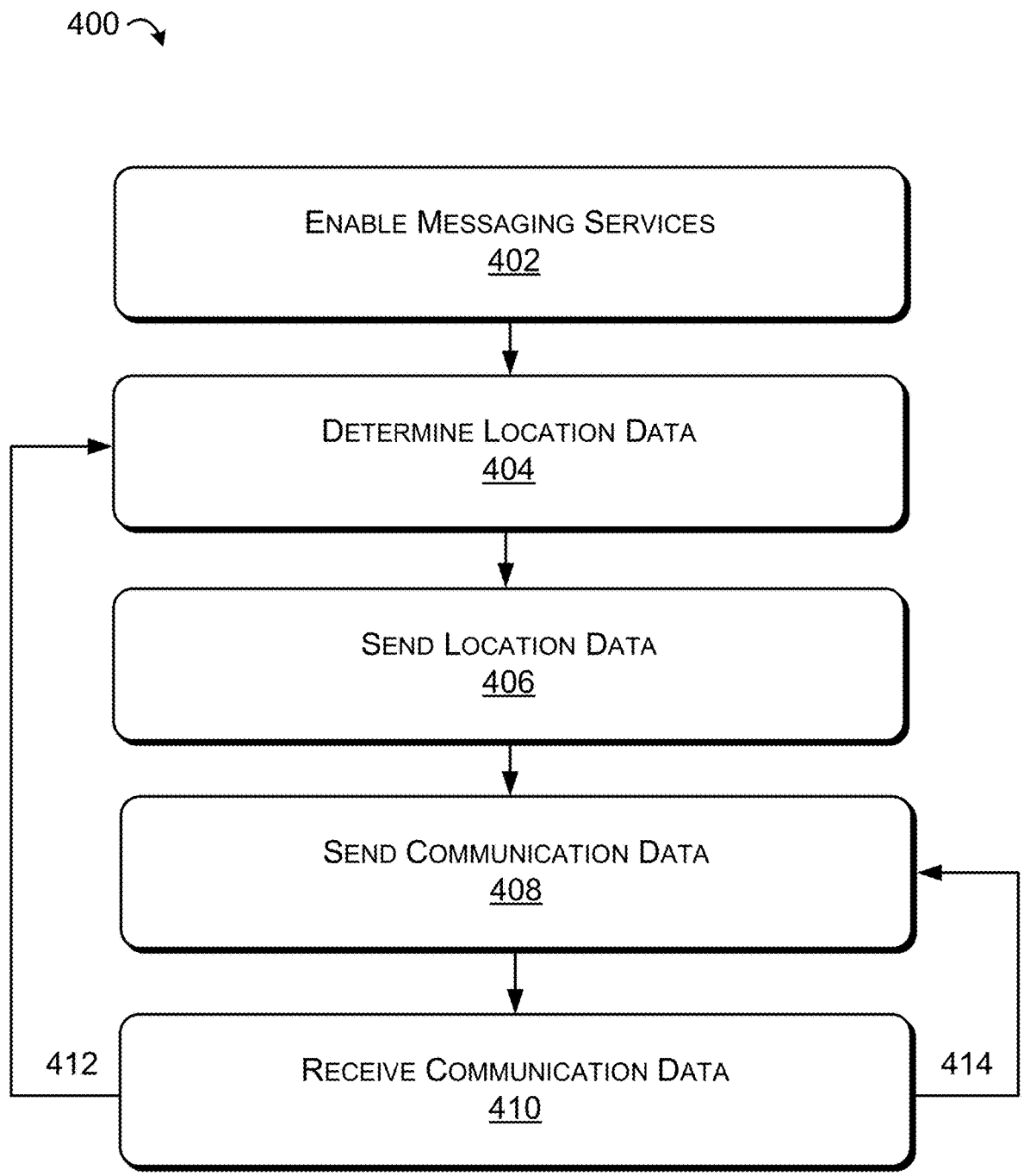
FIG. 4 is a flow diagram that illustrates an example process to cause location information associated with users in flight to be presented to other users associated with messaging services.

FIG. 4 is a flow diagram that illustrates an example process 400 to cause location information associated with users (e.g., user A 108A) in flight to be presented to other users (e.g., user B 108B, etc.) associated with messaging services. FIG. 4 can illustrate an example process 400 from the perspective of a first user device (e.g., user device A 110A). As described above, it should be appreciated that more or fewer operations can be performed than shown in the FIGS. and described herein. These operations can also be performed in parallel, or in a different order than those described herein. Some or all of these operations might also be performed by components other than those specifically identified.

Block 402 illustrates enabling messaging services. From the perspective of a user device (e.g., user device A 110A), the user device (e.g., user device A 110A) can send a DNS query to a first service provider (e.g., service provider B 104) to initiate the enabling. The first service provider (e.g., service provider B 104) can forward the DNS query to a second service provider (e.g., service provider A 102) to enable the messaging services as described above by the blocks associated with group 208.

Block 404 illustrates determining location data. As described above, the presence data can include location data. The location data can be determined by one or more location devices associated with the aircraft and/or a user device (e.g., user device A 110A) and/or can be input by a user (e.g., user A 108A) via a corresponding user device (e.g., user device A 110A). The location devices can provide location data to the location module 148, as described below.

Block 406 illustrates sending location data. The first user device (e.g., user device A 110A) can send location data to the presence module 124. In alternative examples, the presence module 124 can determine location data, as described above. In some examples, determining the location data and/or sending the location data can be based at least in part on sending communication data to the at least one second user device (e.g., user device(s) B 110B). In other examples, determining the location data and/or sending the location data can be based at least in part on a regular interval, particular frequency, etc. In at least one example, determining the location data and/or sending the location data can be based at least in part on one or more parameters stored in the parameter module 126 and/or data stored in the user profile(s) 128 described above.

Block 408 illustrates sending communication data. As described above, the data exchange module 144 can be configured to send and/or receive communication data to and/or from other user devices 110 (e.g., user device(s) B 110B) via the network(s) 106 and/or service providers (e.g., service provider A 102, service provider B 104, etc.). The multimedia communication module 122 can receive the communication data from the data exchange module 114 and can route the communication data to the intended recipient (e.g., user device(s) B 110B).

Block 410 illustrates receiving communication data. In at least some examples, the first user device (e.g., user device A 110A) can receive communication data from the one or more second user devices (e.g., user device(s) B 110B). In some examples, the communication data can be received responsive to the first user device (e.g., user device A 110A) sending communication data. In other examples, the communication data can be received from additional and/or alternative second user devices (e.g., user device(s) B 110B) and may not be responsive to the first user device (e.g., user device A 110A) sending communication data. The multimedia communication module 122 can manage the exchange of communication data between user devices 110. The multimedia communication module 122 can receive the communication data from the at least one second user device (e.g., user device(s) B 110B) and can route the communication data to the intended recipient (e.g., user device A 110A).

Based at least in part on receiving communication data, as illustrated in block 410, the operations represented by blocks 404-410 can be repeated, as illustrated by line 412. That is, in some examples, the location module 148 can determine location data based at least in part on receiving communication data and can send updated location data to the presence module 124 at a same or different time as the data exchange module 144 sends subsequent communication data to the multimedia communication module 122. In other examples, some of the operations represented in example process 400 can be repeated, as illustrated by line 414. That is, in some examples, the location module 148 can delay determining location data until a later time that is consistent with the one or more parameters, etc., and, based at least in part on receiving communication data, the data exchange module 144 can send subsequent communication data to the multimedia communication module 122.

Figure 5:
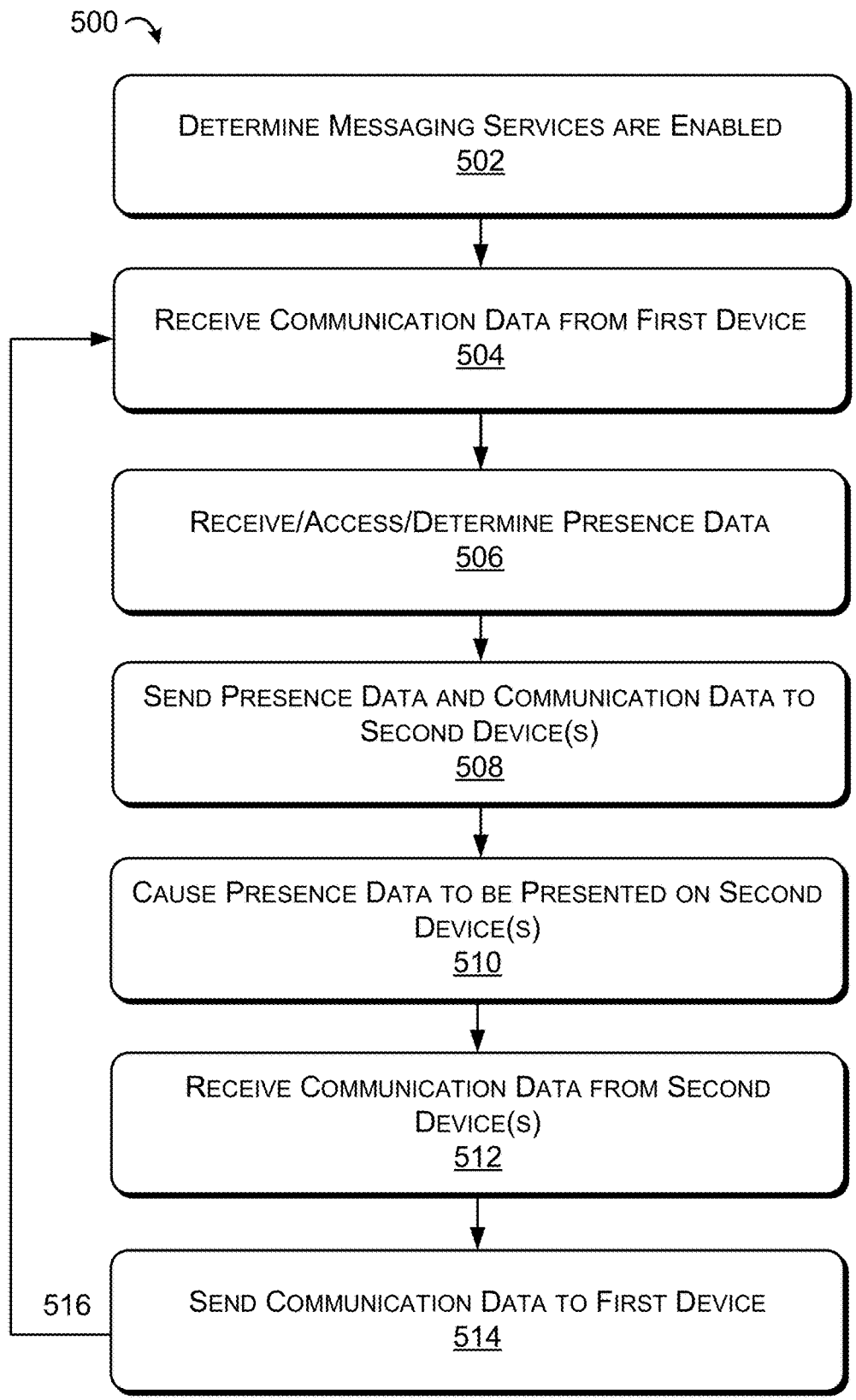
FIG. 5 is a flow diagram that illustrates an example process to cause social presence data associated with users in flight to be presented to other users associated with messaging services.

FIG. 5 is a flow diagram that illustrates an example process to cause social presence data associated with users in flight (e.g., user A 108A) to be presented to other users (e.g., user B 108B, etc.) associated with messaging services. FIG. 5 can illustrate an example process 500 from the perspective of a service provider (e.g., service provider A 102). As described above, it should be appreciated that more or fewer operations can be performed than shown in the FIGS. and described herein. These operations can also be performed in parallel, or in a different order than those described herein. Some or all of these operations might also be performed by components other than those specifically identified.

Block 502 illustrates determining that messaging services are enabled. A first service provider (e.g., service provider B 104) can receive a DNS query from a first user device (e.g., user device A 110A) to initiate the enabling. The first service provider (e.g., service provider B 104) can forward the DNS query to a second service provider (e.g., service provider A 102) to enable the messaging services as described above by the blocks associated with group 208. The second service provider (e.g., service provider A 102) can receive the DNS query from the first service provider (e.g., service provider B 104) to enable the messaging services.

Block 504 illustrates receiving communication data from a first user device (e.g., user device A 110A). As described above, the data exchange module 144 can be configured to send and/or receive communication data to and/or from other user devices 110 (e.g., user device(s) B 110B) via the network(s) 106 and/or service providers (e.g., service provider A 102, service provider B 104, etc.). The communication data can include text messages, multimedia messages, voice messages represented by visual elements, etc. The multimedia communication module 122 can receive the communication data from the data exchange module 114 and can route the communication data to the intended recipient (e.g., user device(s) B 110B).

Block 506 illustrates receiving/accessing/determining presence data. The presence module 124 can receive, access, and/or determine presence data associated with users 108, as described above.

Block 508 illustrates, sending the communication data and the presence data to the at least one second user device (e.g., user device(s) B 110B), as described above.

Block 510 illustrates causing the presence data to be presented on the at least one second user device (e.g., user device(s) B 110B), as described above. Examples of graphical and/or textual elements that can be rendered by the presentation module 150 are shown in FIGS. 6A-6C and described below.

Block 512 illustrates receiving communication data from at least one second user device (e.g., user device(s) B 110B). As described above, second user devices (e.g., user device(s) B 110B) can send communication data to the first user device (e.g., user device A 110A). In some examples, the second user devices (e.g., user device(s) B 110B) can send communication data to the first user device (e.g., user device A 110A) based at least in part on receiving communication data from the first user device (e.g., user device A 110A). The multimedia communication module 122 can manage the exchange of communication data between user devices 110. The multimedia communication module 122 can receive the communication data from the at least one second user device (e.g., user device(s) B 110B) and can route the communication data to the intended recipient (e.g., user device A 110A).

Block 514 illustrates sending the communication data to the first user device (e.g., user device A 110A). As described above, the multimedia communication module 122 can route the communication data to the intended recipient (e.g., user device A 110A).

Based at least in part on sending the communication data to the first user device (e.g., user device A 110A), as illustrated in block 514, the operations represented by blocks 504-414 can be repeated, as illustrated by line 516. That is, in some examples, the presence module 124 can receive, access, and/or determine updated presence data based at least in part on sending the communication data and can send updated presence data to the presence module 124 at a same or different time as the data exchange module 144 sends subsequent communication data to the multimedia communication module 122.

FIGS. 6A-6C are schematic diagrams showing an example user interface 600 for presenting presence data associated with users (e.g., user A 108A) in flight to be presented to other users (e.g., user B 108B, etc.) associated with messaging services. As described above, the presentation module 150 can be configured to receive presence data and cause graphical and/or textual elements corresponding to the presence data to be presented on a display 142 of a corresponding user device (e.g., user A 110A, user B 110B, etc.). In at least one example, the presence module 124 can send the presence data and data corresponding to graphical and/or textual elements to the presentation module 150. The presentation module 150 can render the graphical and/or textual elements such to cause the presence data to be presented on the display 142.

Example user interface 600 illustrates a text message conversation 602 between two users (e.g., user A and user B). As described above, in additional and/or alternative examples, users can exchange multimedia messages and/or visual voicemails, as described above. Example user interface 600 can display graphical and/or textual elements representative of information associated with a user (e.g., user A 108A). In example user interface 600, the information can include a graphical element 604 representative of the user (e.g., user A 108A), an alias 606 associated with a user (e.g., user A 108A), and presence data.

FIG. 6A is schematic diagram showing the example user interface 600 where the presence data is represented by a textual element 608A that is presented on a display 142 of the user device(s) B 110B. In FIG. 6A, the presence data 608 is availability data. However, location data and/or personal data can additionally and/or alternatively be presented. Additional examples of graphical and/or textual elements can be rendered by the presentation module 150. In at least one example, the presence data can be associated with a time stamp indicating a time that the presence module 124 accessed, received, and/or determined the presence data. In some examples, the time stamp can be associated with a time zone, indicating which time zone the user (e.g., user A 108A) was located in when the presence data was updated. Textual elements 610 corresponding to the time stamp and/or the time zone can be presented on the user interface 600. In some examples, users can add additional features to the user interface 600 such as favorite links to publish hypertext links of personal or favorite websites (e.g., blogs, social media pages etc.), aliases associated with other applications (e.g., social media applications, etc.), open text, etc.

FIG. 6B is schematic diagram showing the example user interface 600 where the presence data is represented by a combination of a textual element and a graphical element 608B that is presented on a display 142 of the user device(s) B 110B. In FIG. 6B, the presence data is location data indicating that the user (e.g., user A 108A) is flying over Paris, France. The graphical element is shown as a representation of a landmark in Paris, France, the Eiffel Tower. In some examples, the graphical element can be a representative image and/or graphic that can be accessed from a database of graphical elements. In other examples, the graphical element can be a map representative of the location that can be access from a database of graphical elements. Availability data and/or personal data can additionally and/or alternatively be presented. Additionally and/or alternatively, a time stamp can be presented with the presence data and in some examples, the time stamp can be associated with a time zone, indicating which time zone the user (e.g., user A 108A) was located in when the presence data was updated, as described above. Additional examples of graphical and/or textual elements can be rendered by the presentation module 150.

FIG. 6C is schematic diagram showing the example user interface 600 where the presence data is represented by graphical elements 608C that are presented on a display 142 of the user device(s) B 110B. In FIG. 6B, the presence data is location data indicating that the user (e.g., user A 108A) is currently in an aircraft. One of the graphical elements 608C is shown as a representation of an aircraft. In some examples, the graphical elements 608C can be a representative image and/or graphic that can be accessed from a database of graphical elements. In additional and/or alternative examples, the graphical elements 608C can be a map representative of the location that can be access from a database of graphical elements, as shown in FIG. 6C. In FIG. 6C, the user (e.g., user A 108A) is located over Paris, France. In some examples, availability data and/or personal data can additionally and/or alternatively be presented. Additionally and/or alternatively, a time stamp can be presented with the presence data and in some examples, the time stamp can be associated with a time zone, indicating which time zone the user (e.g., user A 108A) was located in when the presence data was updated, as described above. Additional examples of graphical and/or textual elements can be rendered by the presentation module 150.

FIGS. 6A-6C are three examples of user interfaces that can be rendered for publishing social presence data. However, various other elements, content, layouts, etc. can additionally and/or alternatively be used for publishing social presence data to users of messaging services associated with telecommunications service providers.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system associated with a telecommunications service provider, the system comprising:
   one or more processors;
   memory; and
   computer instructions stored in the memory and executable by the one or more processors to perform operations comprising:
      determining that messaging services offered by the telecommunications service provider are enabled to facilitate an exchange of communication data between (i) a first user device associated with a first user, physically located in an aircraft in flight, and associated with a connectivity services service provider and (ii) at least one second user device associated with a second user;
      receiving the communication data from the first user device;
      identifying one or more emoticons in the communication data to determine mood or sentiment of the first user;
      receiving personal data associated with the first user;
      augmenting, as augmented personal data, the personal data with data that indicates the mood or sentiment of the first user;
      receiving location data from a location device;
      accessing presence data received from the first user device, the presence data including the location data and the augmented personal data;
      sending the communication data, via the telecommunications service provider, to the at least one second user device; and
      causing the presence data to be presented on the at least one second user device.

2. The system as claim 1 recites, wherein the communication data comprises a text message, a multimedia message, or a voice message represented by a visual element.

3. The system as claim 1 recites, wherein causing the presence data to be presented on the at least one second user device further comprises causing a text element to be presented, the text element indicating a geographical location of the first user identified by the location data.

4. The system as claim 1 recites, wherein causing the presence data to be presented on the at least one second user device further comprises causing a graphical element to be presented, the graphical element indicating a geographical location of the first user identified by the location data.

5. The system as claim 1 recites, wherein causing the presence data to be presented on the at least one second user device further comprises causing a text element to be presented, the text element indicating that the first user is on the aircraft.

6. The system as claim 1 recites, wherein causing the presence data to be presented on the at least one second user device further comprises causing a graphical element to be presented, the graphical element indicating that the first user is on the aircraft.

7. The system as claim 1 recites, wherein the presence data further includes data indicating a birthday or an anniversary.

8. The system as claim 1 recites, wherein the second user is physically located in the aircraft.

9. The system of claim 1, wherein causing the presence data to be presented on the at least one second user device is based in part on one or more parameters associated with (i) a time the presence data is to be presented on the at least one second user device, (ii) an event causing an update to the presence data, (iii) a length of time that the presence data is presented on the at least one second user device, (iv) a frequency in which the presence data is updated, (v) how the presence data is to be presented on the at least one second user device, or (vi) whether a textual element, a graphical element, or a combination of a textual element and a graphical element is to be presented on the at least one second user device.

10. A computer-implemented method comprising:
receiving, from a first user device associated with a first user that is physically located in an aircraft in flight, a query to enable messaging services offered by a telecommunications service provider;
sending, via the telecommunications service provider, communication data to a second user device associated with the telecommunications service provider;
receiving, via the telecommunications service provider, availability data from the first user device, the availability data being based at least in part on an electronic calendar associated with the first user device and the availability data indicating that the first user is available, unavailable, or in a meeting;
receiving location data from a location device;
identifying one or more emoticons in the communication data to determine mood or sentiment of the first user;
receiving personal data associated with the first user;
augmenting, as augmented personal data, the personal data with data that indicates the mood or sentiment of the first user;
determining presence data accessed from the first user device, the presence data comprising the location data, the augmented personal data, and the availability data; and
sending, via the telecommunications service provider, the presence data to the second user device.

11. The computer-implemented method as claim 10 recites, wherein determining the presence data is based at least in part on sending the communication data.

12. The computer-implemented method as claim 10 recites, wherein determining the presence data is based at least in part on an interval of time.

13. The computer-implemented method as claim 10 recites, wherein determining the presence data is based at least in part on a lapse of a period of time.

14. The computer-implemented method as claim 10 recites, wherein the electronic calendar resides on the first user device.

15. One or more non-transitory computer storage media having computer-executable instructions that, when executed by one or more processors, cause the one or more processors to perform operations comprising:
determining that messaging services are enabled to permit a first user device to send communication data to one or more second user devices, wherein:
the first user device is associated with a first user that is physically located in an aircraft in flight;
individual second user devices of the one or more second user devices are associated with second users; and
the first user and the second users each have user profiles associated with a telecommunications service provider providing the messaging services;
receiving, via the telecommunications service provider, the communication data from the first user device;
identifying one or more emoticons in the communication data to determine mood or sentiment of the first user;
receiving location data from a location device;
receiving personal data associated with the first user;
augmenting, as augmented personal data, the personal data with data that indicates the mood or sentiment of the first user;
accessing presence data from the first user device, the presence data including the location data and the augmented personal data;
sending, via the telecommunications service provider, the communication data to at least one second user device of the one or more second user devices; and
causing the presence data to be presented on the at least one second user device.

16. The one or more non-transitory computer storage media as claim 15 recites, wherein the second users correspond to contacts on a contacts list associated with a first user profile of the user profiles, the first user profile corresponding to the first user.

17. The one or more non-transitory computer storage media as claim 15 recites, wherein the presence data further includes data indicating a birthday or an anniversary.

18. The one or more non-transitory computer storage media as claim 15 recites, wherein the operations further comprise:
receiving, via the telecommunications service provider, updated presence data from the first user device; and
causing the updated presence data to be presented on the at least one second user device.

19. The one or more non-transitory computer storage media as claim 15 recites, wherein the operations further comprise:
determining a time stamp associated with the presence data; and
causing the time stamp to be presented with the presence data on the at least one second user device.

\* \* \* \* \*